C. A. CHANDLER.
COTTON SEED HULLER.
APPLICATION FILED MAY 29, 1909.
1,027,320.
Patented May 21, 1912.
3 SHEETS—SHEET 1.
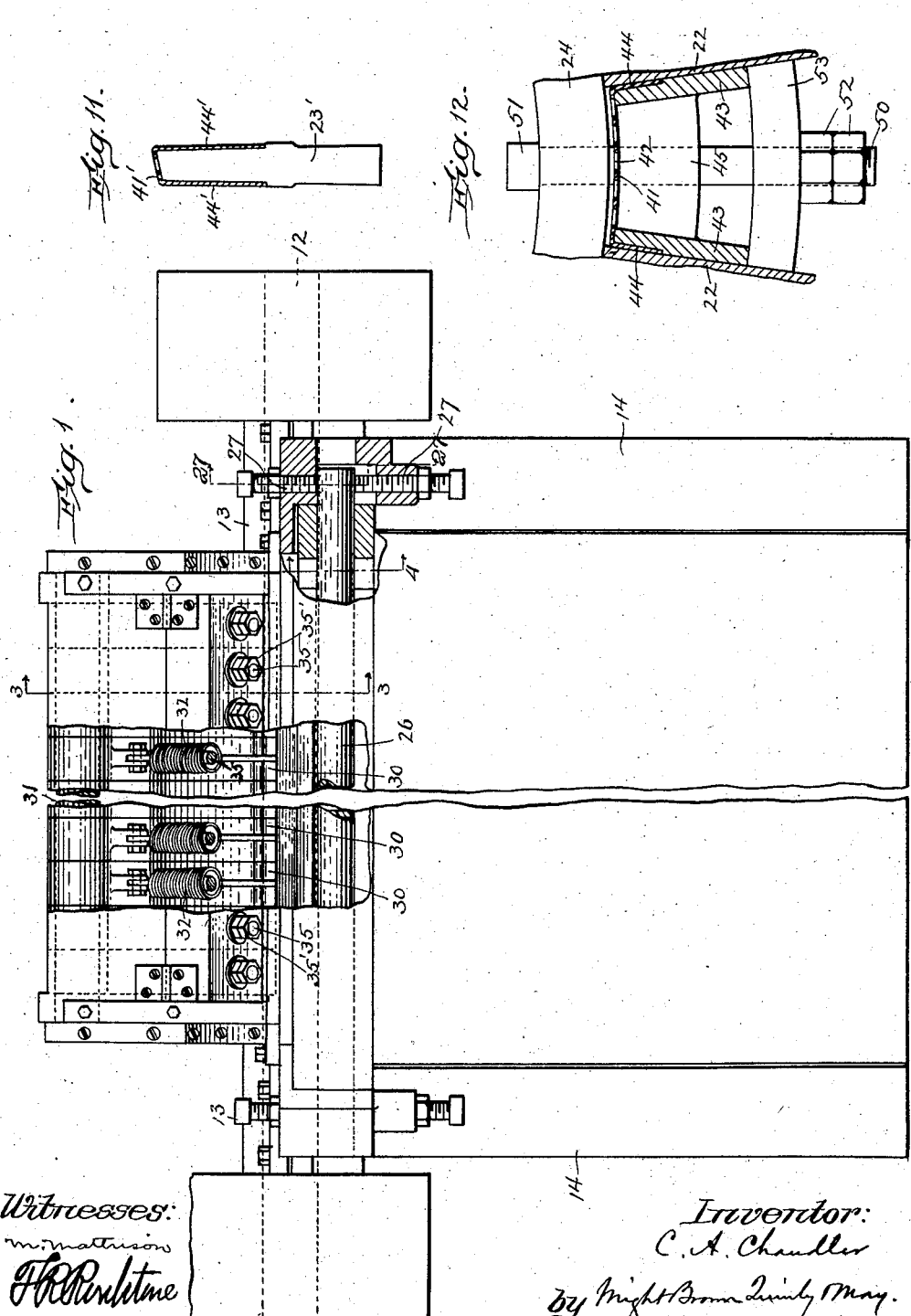

C. A. CHANDLER.
COTTON SEED HULLER.
APPLICATION FILED MAY 29, 1909.
1,027,320.
Patented May 21, 1912.
3 SHEETS—SHEET 2.
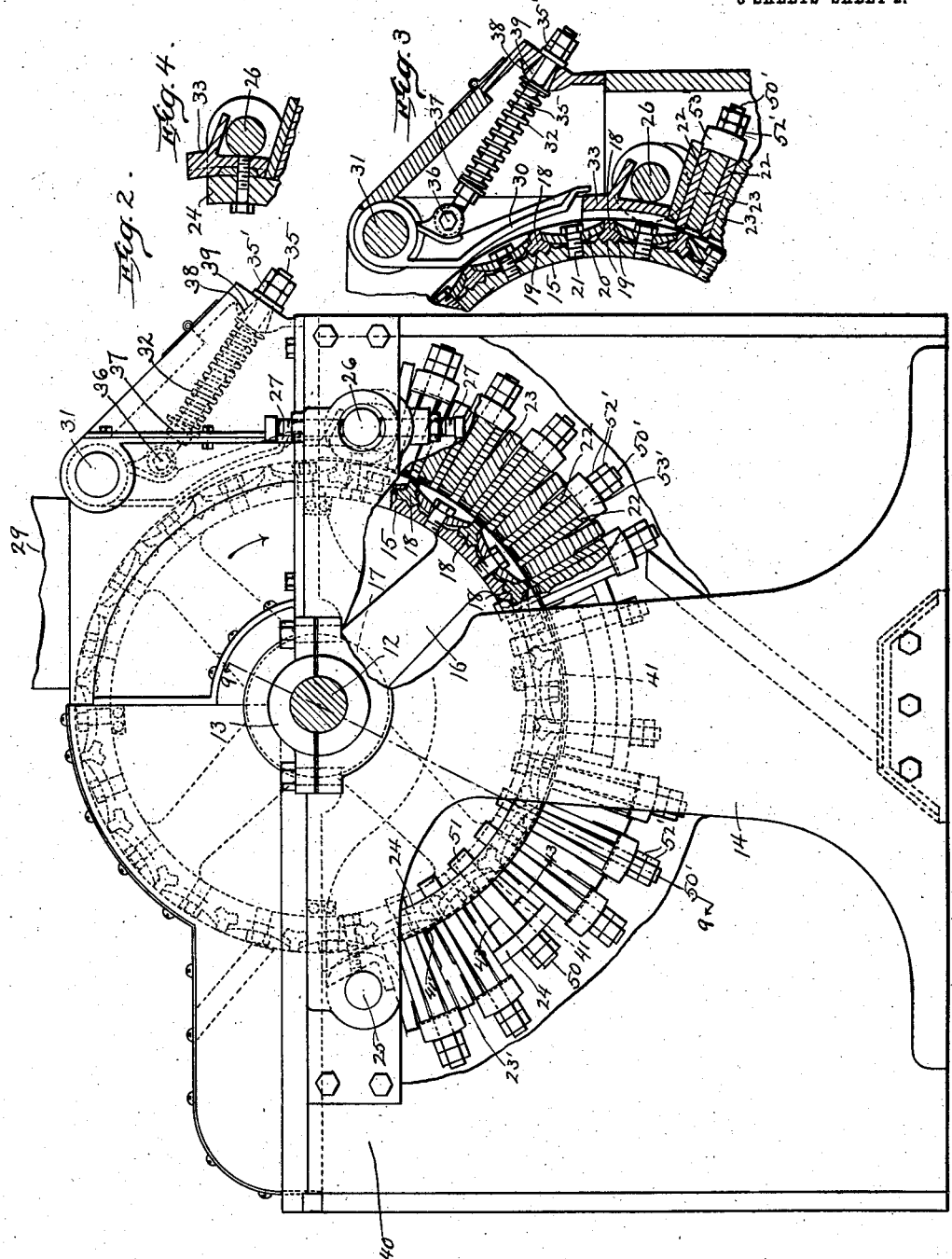

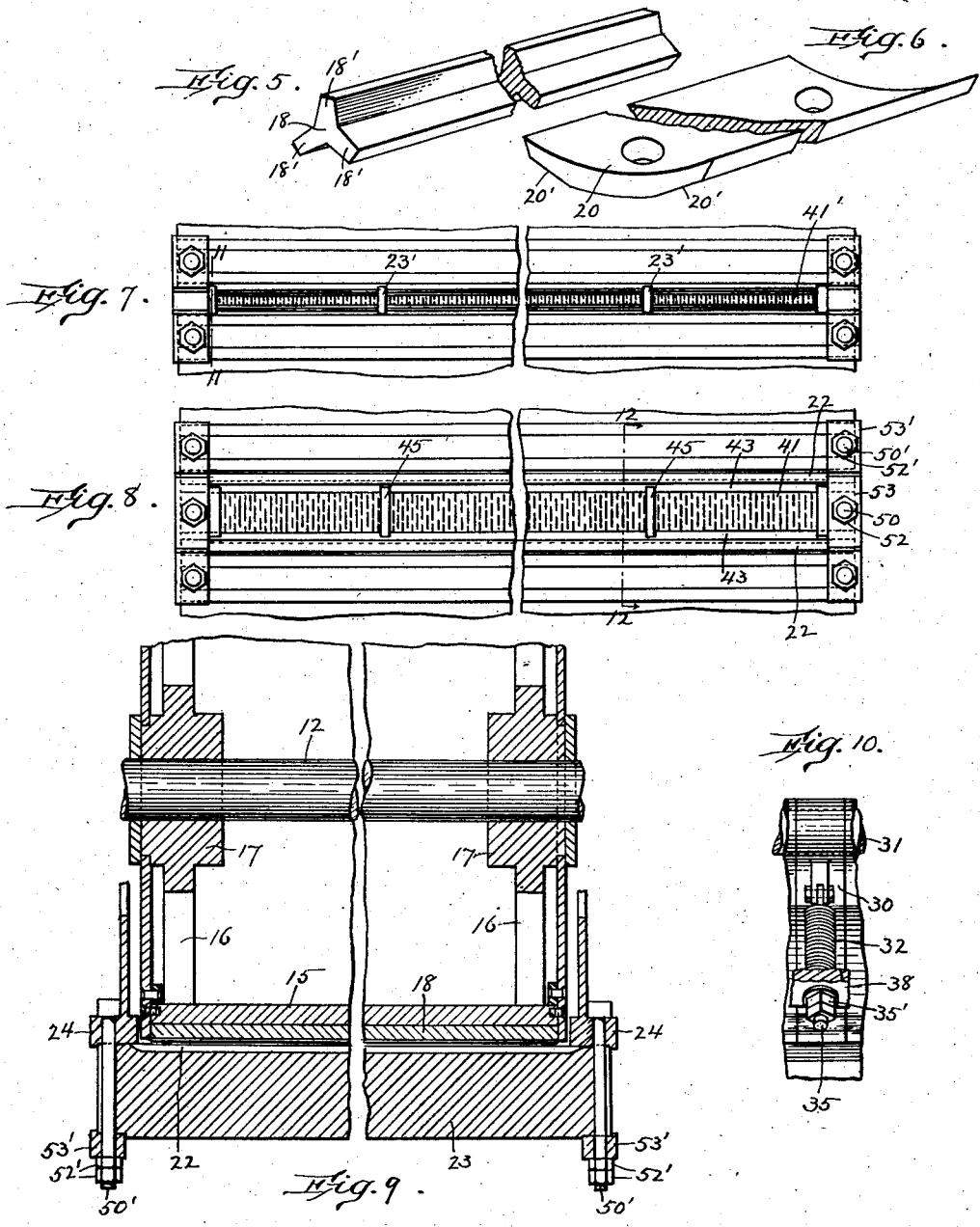

UNITED STATES PATENT OFFICE.

CLARENCE A. CHANDLER, OF EAST BRIDGEWATER, MASSACHUSETTS.

COTTON-SEED HULLER.

1,027,320.	Specification of Letters Patent.	Patented May 21, 1912.

Application filed May 29, 1909. Serial No. 499,175.

*To all whom it may concern:*

Be it known that I, CLARENCE A. CHANDLER, of East Bridgewater, in the county of Plymouth and State of Massachusetts, have invented certain new and useful Improvements in Cotton-Seed Hullers, of which the following is a specification.

This invention relates to machines for disintegrating bodies, such as the seeds of the cotton plant, such seeds having brittle hulls to which a small quantity of lint adheres.

The invention has reference to a machine for breaking up the hulls and the kernels contained therein, thus reducing the seeds to suitable form for separating the kernel portions from the hulls and lint preparatory to extracting oil from the kernels, and otherwise utilizing the same.

The invention consists in certain improvements in a machine adapted to perform the work above indicated, whereby the durability and efficiency of the machine are increased.

The invention also consists in an improved form of knife-carrying cylinder and of hulling-knife-bars carried thereby, the construction being such that each knife bar presents a plurality of knives adapted to be used interchangeably, each knife-bar presenting a relatively large number of cutting edges, preferably six, each of which may be brought into operative position so that the machine equipped with a cylinder and knife-bars embodying my invention, may be used for a protracted period without the necessity of grinding the knives, the construction of the knife-bars being such that after all the cutting edges have been dulled by wear, the bar may be discarded and replaced by a new one.

Of the accompanying drawings, forming a part of this specification,—Figure 1 represents a front elevation of a machine embodying my invention, portions of the machine being broken away, and other portions shown in section. Fig. 2 represents an end elevation, parts being broken away, and parts shown in section. Fig. 3 represents a section on line 3—3 of Fig. 1. Fig. 4 represents a section on line 4—4 of Fig. 1. Fig. 5 represents a perspective view of one of the knife-bars shown in section in Fig. 2. Fig. 6 represents a perspective view of one of the knife-bar-confining plates shown in section in Fig. 2. Figs. 7 and 8 represent fragmentary views of the outer or under side of the concave which coöperates with the knife-carrying cylinder. Fig. 9 represents a section on line 9—9 of Fig. 2. Fig. 10 represents a fragmentary front elevation showing portions of the construction represented in Fig. 1. Fig. 11 represents a section on line 11—11 of Fig. 7. Fig. 12 represents a section on line 12—12 of Fig. 8.

The same reference characters indicate the same parts in all the figures.

In the drawings,—12 represents a horizontal shaft journaled in bearings 13, which are supported by fixed standards 14. To the shaft 12 is connected a knife-carrying cylinder 15 by arms or spokes 16 formed on hubs 17 which are secured to the shaft 12. The knives carried by the cylinder 15 are parts of multiple knife-bars 18, each of the form represented in perspective in Fig. 5, and in section in Fig. 2. Each bar is provided with a series of preferably three parallel-sided knives 18' radiating from the center of the bar, the latter having a tridentate cross section.

The cylinder 15 is provided with seats 19 formed to conform to and support two of the knives 18' in such position that the third knife projects radially from the periphery of the cylinder, the seats bearing on the inner sides and portions of the outer edges of the two knives which are not in use, and therefore securely supporting the knife-bar as a whole against lateral displacement. The knife-bars are clamped to the cylinder by means of clamping plates 20 formed to extend across the space between two adjacent knife-bars, the inner side of the plate having two beveled faces 20' adapted to bear on the outer sides of the two knives which are not in use. The plates 20 are detachably secured to the cylinder by bolts 21.

It will be seen that each of the knives 18' is adapted to be placed in an operative position with its cutting angles and edges projecting from the periphery of the cylinder, the other two knives bearing on the cylinder and constituting a base for the acting knife. The cutting edges of each knife are formed by the intersection of the outer edge and sides of the knife, the sides being parallel with each other, so that they are at right angles with the outer edge of the knife. When one cutting edge has been worn, the opposite cutting edge of the same knife may be brought into operative position by removing the knife-bar and turning it end for end. When both cutting edges of either knife have been worn, another knife may be brought into operative position by partially turning the knife-bar, these operations being repeated until all the cutting edges have been worn out. Each knife-bar presenting a plurality of knives, each having two cutting edges, enables the machine to be operated for a long period without grinding the cutting edges.

The knife-bar formed as shown, is adapted to be rolled or drawn by well-known processes and instrumentalities, so that it may be produced at a relatively low cost, and may therefore be discarded when all the cutting edges have been worn.

With the cylinder 15 and its knives, coöperates a concave having a series of fixed knives 22 which are detachably secured to the frame of the concave, the general construction of the concave, the knives, and the knife-securing means being substantially as shown in Letters Patent of the United States, No. 916,913, granted to me March 30, 1909, the knives being spaced apart by wooden wedges 23. The frame of the concave includes segmental end portions 24 carrying the knives 22, and the means for securing the same. One end of the concave is pivoted at 25 to the frame of the machine, the other end being provided with a transverse stud 26, the ends of which are adjustably secured by bearing screws 27 in the frame of the machine, provision being thus made for slightly adjusting the concave toward and from the periphery of the cylinder by raising or lowering its forward edge, which is the edge to which the stud 26 is attached. The forward edge of the concave is located considerably below the highest part of the cylinder, so that a segment of the cylinder between its highest part and the forward edge of the concave is exposed for the reception of the material to be supplied by a chute 29, which discharges the material upon the exposed portion of the cylinder above the forward edge of the concave.

The material is disintegrated by its passage between the cylinder and the concave, and in case said material is made up of cotton seeds, the hulls are broken and detached from the kernels, and the latter are crushed by the conjoint action of the revolving knives of the cylinder, and the fixed knives of the concave. It often happens that rigid bodies, such as metallic nuts, bolts, and other objects which may accidentally find their way into a mass of cotton seeds, damage the knives of the cylinder and concave by passing with the cotton seeds between said parts. To prevent this damage, I arrange the forward edge of the concave at a point considerably below the highest part of the cylinder, as above described, and provide a guide for the material, located between the delivering end of the chute 29 and the forward edge of the concave, said guide being composed of independently movable sections, each yieldingly held in coöperative relation with the cylinder, and adapted to be displaced outwardly to permit the centrifugal discharge of rigid bodies above the forward edge of the concave. Said guide, in the present embodiment of my invention, is composed of a series of spring-pressed arms 30 which are mounted side by side on a fixed horizontal stud 31 which constitutes an axis common to all the arms, the arms being in close proximity to each other edge to edge, so that they collectively form a guide which confines the material fed to the cylinder by the chute 29 against the perimeter of the cylinder until the material reaches the forward edge of the concave and passes between it and the cylinder. The arms 30 are pressed inwardly by springs 32 toward the cylinder, the inward movement of the arms being limited by stop nuts hereinafter described, their lower ends being normally in close proximity to a girt or cross bar 33, forming the forward edge of the concave, the inner sides of said arms being in close proximity to the cylinder knives without actually touching the same. The arms 30 constitute a guide which conducts light material, such as cotton seeds, to the forward edge of the concave, each arm constituting an independently yielding section of the guide, which is adapted to yield in case a rigid body passes between it and the cylinder. The cylinder is rotated rapidly in the direction indicated by the arrow in Fig. 2. In case a hard body, such as a nut or bolt, passes between the cylinder and one of the arms 30, the arm is forced outwardly thereby and the hard body, to which a rapid motion has been imparted by the cylinder, is thrown outwardly between the lower end of the arm 30 and the forward edge portion 33 of the concave. The cotton seeds accompanying the hard body are not thrown outwardly to a sufficient extent to cause many of them to escape with the hard body. As soon as the body has passed outwardly, the arm 30 is returned to its normal position by the spring 32. Each spring is supported by a rod 35 hinged at 36 to an ear on the accompanying arm 30, the rod having a shoulder or enlargement 37 against which one end of the spring bears. The other end of the spring bears on a fixed abutment 38 which is a part of the housing or casing of the machine, and is slotted at 39 to permit the passage of the rod 35. Each rod 35 is provided with a stop nut 35′ which limits the inward movement of the accompanying arm by the spring. The sections or members 30 are located above the horizontal plane of the axis of the cylinder, and they are so formed that a rigid body striking either one of said sections at its obtuse angled portion will force it outwardly in such manner that such rigid body will be permitted to escape at a tangent and without being located temporarily or otherwise in any such position as to cause damage to the knives of either the cylinder or the concave.

The disintegrated matter formed by the coöperation of the cylinder and concave is discharged into a chamber 40, the upper portion of which communicates with the outlet end of the space or crevice between the cylinder and concave, said outlet end being immediately above the pivoted rear edge of the concave. To prevent a congestion of the reduced material, including fragments of hulls and kernels, and particles of lint, at the delivering end portion of the said space or crevice, I provide the concave with one or more screens located between the front and rear edges of the concave, and adapted to permit the outward passage of portions of the disintegrated matter, so that the entire product of the machine does not have to pass through the delivering end portion of the crevice between the cylinder and concave.

In the embodiment of my invention here shown, the concave is provided with a screen 41 which is preferably a sheet metal plate provided with slots 42 extending at right angles to the axis of the cylinder. The knives 22 of the concave are arranged in groups which are separated by the screen 41, the frame of the concave being provided with transverse bars or members 43 constituting the sides of an open space between the groups of knives, the screen 41 extending across said space and being preferably provided with flanges 44 which are interposed between the frame members 43 and the sides of two adjacent knives 22. To the frame members 43 are secured cross bars 45 which support the screen at intervals to prevent it from sagging, and rigidly connect and space apart the bars 43.

The bars 43 and screen 41 are attached to the concave by bolts 50 passing through the segmental end portions 24 and having heads 51 bearing on the inner sides of said end portions, nuts 52 engaged with the threaded outer portions of the bolts, and arms 53 perforated to receive the bolts 50 and held by the nuts 52 against the bars 43. The screen and the described means for securing it constitute an equivalent of and displace one or more of the wedges 23, the adjacent knives 22 bearing against the outer sides of the bars 43. The screen structure shown in Fig. 12 displaces three of the wedges and a corresponding number of knives. The screen structure shown by dotted lines in Fig. 2, about midway between the forward and back edges of the concave, is wider and displaces a greater number of wedges and knives.

In Fig. 11 and near the rear edge of the concave in Fig. 2, I show a screen of minimum width having the same general external form as, and adapted to serve as a substitute for, one of the wedges 23, the screen being composed of a slotted or foraminous sheet metal plate 41' having flanges 44' which extend over and are riveted to opposite edges of bars 23'. There are several of these bars as shown in Fig. 7, the bars and the sheet metal plate with its flanges constituting an equivalent of a solid wedge 23, and being of open construction so that the reduced material can pass freely through it. This combined screen and wedge is interposed between two adjacent knives 22, so that if all the wedges of the concave were of this construction, it would not be necessary to reduce the number of knives in consequence of the employment of screens in the concave. A screen or screens located, as described, between two knives or groups of knives in the concave enables a considerable portion of the reduced material to pass outwardly into the chamber 40, without passing to the delivering end of the crevice between the concave and cylinder, thus relieving the delivering end portion of said crevice of much of the congestion which would be experienced if all the material were obliged to pass therethrough.

The solid wedges 23 and the knives between which they are located are supported by bolts 50', nuts 52' and arms 53' corresponding with the bolts 50, nuts 52 and arms 53, the arms 53' bearing against the outer edges of the wedges and knives, as shown in Fig. 2.

The described sectional construction of the guide, the same being composed of the independent arms 30, enables the guide to be repaired in case of breakage of one or more of its sections, by removing the broken section and replacing it by another without discarding the entire guide. This advantage is not dependent upon the described independent movability of the sections, and said sections may be rigidly secured in their operative positions if desired.

The relative arrangement of the axis 31 on which the arms 30 swing, the pivots 36, the springs 32, and the abutments 38, is such that the force of the springs diminishes as the arms 30 swing outwardly, this arrangement facilitating the escape of hard bodies thrown outwardly from the cylinder.

The series of sections or arms 30 constitutes a yielding combined detector and escape structure for hard bodies because the portions which are intermediate the ends of the sections are in close proximity to the cylinder, while the pivotal point of the sections is at some distance from the cylinder, and the lower ends of the sections are at such a distance from the cylinder as to enable hard bodies which pass the detector points to be readily thrown out by centrifugal force. The detector points are, of course, those which are in closest proximity to the cylinder.

I claim:

1. A huller comprising a rotary cylinder, a fixed concave and means for permitting foreign bodies to be ejected, said means comprising a series of independent sections side by side and having upper and lower portions at an obtuse angle to each other, said sections being supported at their upper ends with the portions below the angles in close proximity to the path of movement of the operative portions of the cylinder, whereby contact of a rigid body with the obtuse angled portion of either section will cause its lower portion to open and provide an opening of a width exceeding the diameter of such body to permit the latter to be thrown out at a tangent by centrifugal force.

2. A huller comprising a rotary cylinder, a fixed concave and means for permitting foreign bodies to be ejected, said means comprising a series of independent sections side by side above the horizontal plane of the axis of the cylinder, and having upper portions in close proximity to the path of movement of the operative portions of the cylinder, said sections diverging from the cylinder both upwardly and downwardly from the point of close proximity to said cylinder, each section being adapted to be displaced outwardly to permit the centrifugal discharge of rigid bodies above the forward edge of the concave.

3. A huller comprising a rotary cylinder, a fixed concave, means for permitting foreign bodies to be ejected, said means comprising a series of independent sections side by side above the horizontal plane of the axis of the cylinder, and having upper portions in close proximity to the path of movement of the operative portions of the cylinder, said sections diverging from the cylinder both above and below the portions thereof that are in close proximity to the cylinder, and an independent spring and stop for each section.

4. In a huller, a horizontally mounted knife-carrying cylinder, a concave having radial knives coöperating with the knives of the cylinder, a screen interposed between adjacent radial knives, and bearing against the side surfaces thereof, and means for moving the screen radially to wedge it in position.

5. A hulling cylinder having a series of multiple knife bars, each composed of a plurality of wings forming two-edged knives, each wing having substantially parallel sides, the cylinder having seats formed to support said bars with either wing substantially radial to the axis of the cylinder, and means for detachably securing the bars.

6. A hulling cylinder having a series of multiple knife bars, each composed of a plurality of wings forming two-edge knives, each wing having substantially parallel sides, the cylinder having seats formed to support said bars with either wing substantially radial to the axis of the cylinder, plates extending across the space between the knife bars, each plate having its opposite edges engaging portions of adjacent knife bars, and means for removably securing the plates to the cylinder.

7. A hulling cylinder having a series of multiple knife bars, each composed of a plurality of wings forming two-edged knives radiating from a common center, each wing having substantially parallel sides, the cylinder having longitudinal grooves the faces of which form seats fitting surfaces of some of the knives, and clamping plates detachably secured between adjacent knife bars and adapted to overlap the knives bearing on said seats, said seats and clamping plates being formed to hold the bars with each presenting one wing substantially radial to the axis of the cylinder.

8. As an article of manufacture, a multiple knife bar composed of a plurality of longitudinal wings having substantially parallel sides and radiating from a common center, the sides of the bar between the wings forming angular recesses to receive the edges of the clamping plates.

9. In a huller, the combination with a cylinder of alternating knife bars and clamping plates secured thereto, said bars each composed of a plurality of longitudinal wings having substantially parallel sides and radiating from a common center, the sides of the bar between the wings forming angular recesses, the edges of the clamping plates extending into said recesses.

In testimony whereof I have affixed my signature, in presence of two witnesses.

CLARENCE A. CHANDLER.

Witnesses:
P. W. PEZZETTI,
M. L. MATHISON.

Copies of this patent may be obtained for five cents each, by addressing the "Commissioner of Patents, Washington, D. C."